United States Patent [19]

Fitzgerald et al.

[11] Patent Number: 4,463,502
[45] Date of Patent: Aug. 7, 1984

[54] MAGNETIC DISTRIBUTOR-DOWNCOMER FOR FLUIDIZED BEDS AND MAGNETIC VALVE TO CONTROL THE FLOW OF SOLIDS

[76] Inventors: Thomas J. Fitzgerald, 3121 St. Albans Dr., Los Alamitos, Calif. 90720; Octave Levenspiel, 1634 NW. Crest Pl., Corvallis, Oreg. 97330

[21] Appl. No.: 355,955

[22] Filed: Mar. 8, 1982

[51] Int. Cl.³ .............................................. F26B 3/08
[52] U.S. Cl. ............................................ 34/1; 34/10; 34/57 A; 251/129; 137/DIG. 10
[58] Field of Search .......................... 34/1, 10, 57 A; 137/DIG. 10; 251/129, 139

[56] References Cited

U.S. PATENT DOCUMENTS 2,670,749 3/1954 Germer ................................ 251/129
2,743,898 5/1956 King .................................... 251/139
4,038,052 7/1977 Melcher et al. ......................... 34/1

Primary Examiner—Larry I. Schwartz
Assistant Examiner—David W. Westphal
Attorney, Agent, or Firm—Flehr, Hohbach, Test, Albritton & Herbert

[57] ABSTRACT

A technique for controlling the flow of solid particles including at least a certain minimum amount of magnetizable particles in a static fashion, that is, without moving parts is disclosed herein. This technique which relies on magnetism may be utilized for providing a static on/off valve for solids, a static variable control valve for solids, and other valve related operations. The disclosed technique may also produce a distributor for a fluidized bed of magnetic particles along or in combination with non-magnetic particles, and can also be used as a positively controlled distributor-downcomer for single or staged fluidized beds.

31 Claims, 19 Drawing Figures

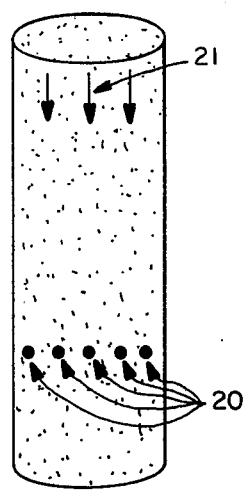
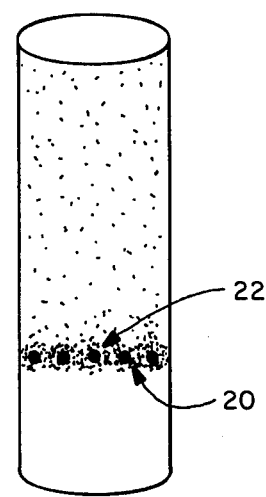
FIG.—1a     FIG.—1b
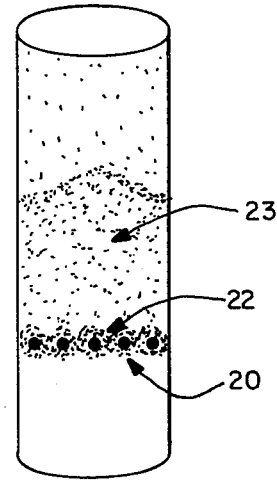
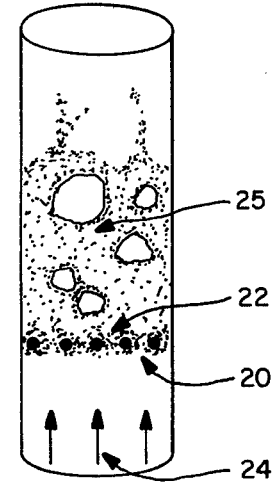
FIG.—1c     FIG.—1d
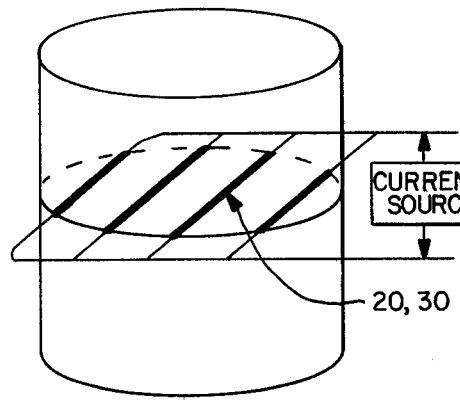
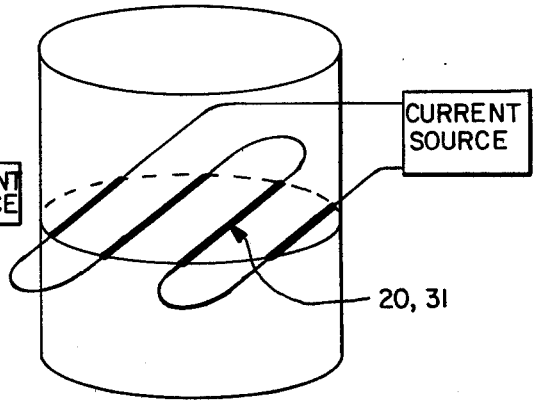
FIG.—2a     FIG.—2b

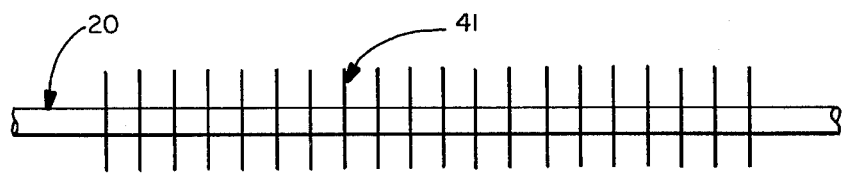
FIG.—3
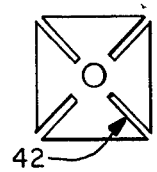
FIG.—3a
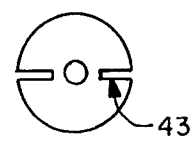
FIG.—3b
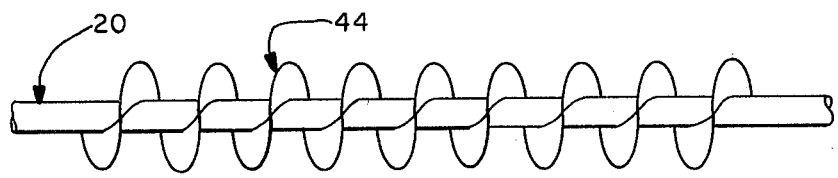
FIG.—4
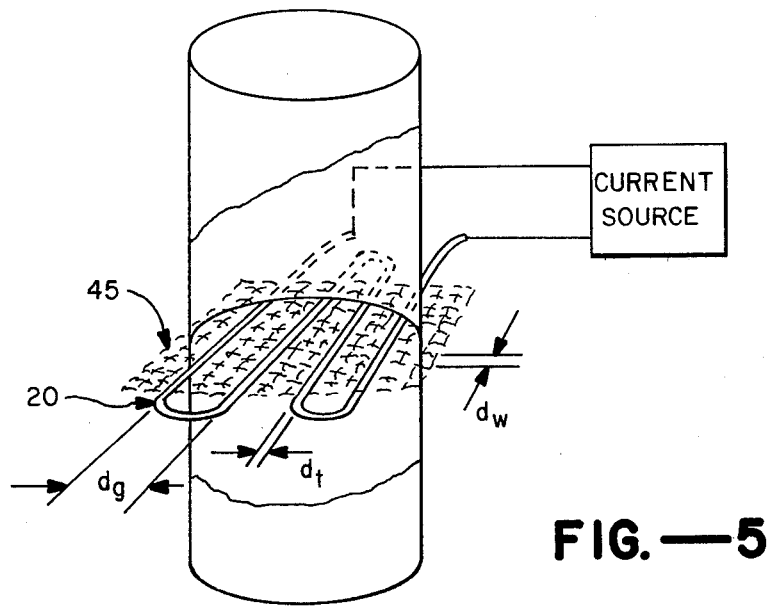
FIG.—5

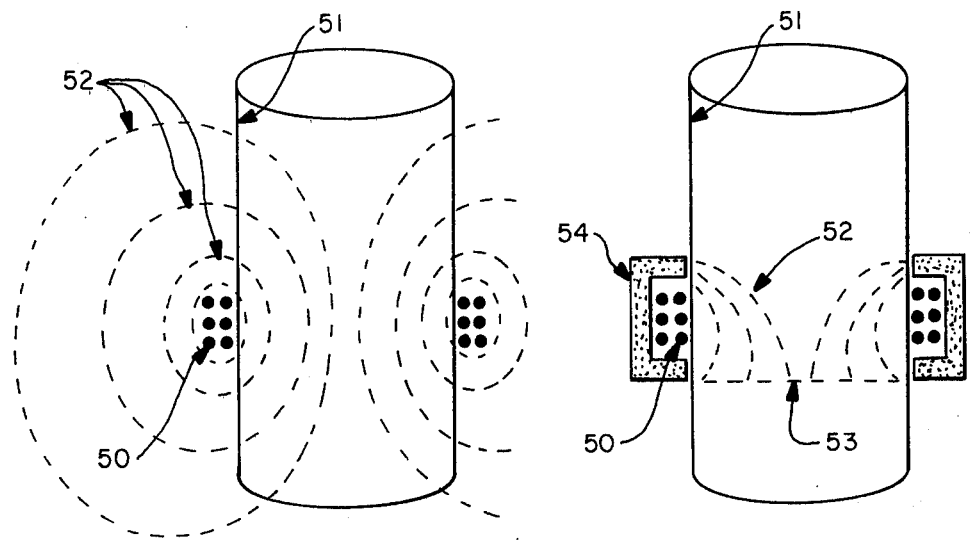
FIG.—6a  FIG.—6b
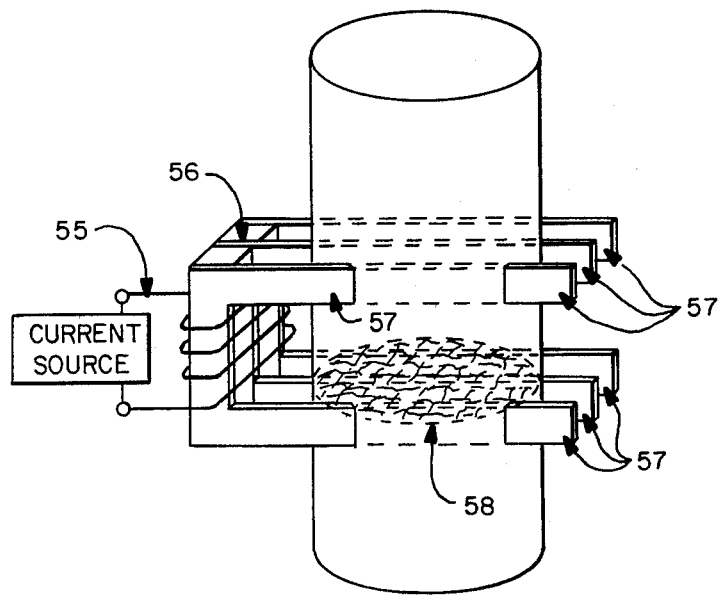
FIG.—7

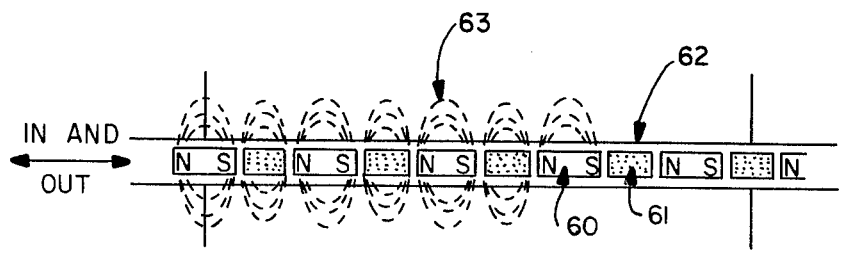
FIG.—8
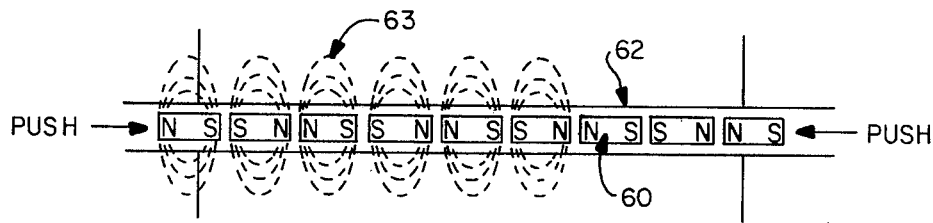
FIG.—9
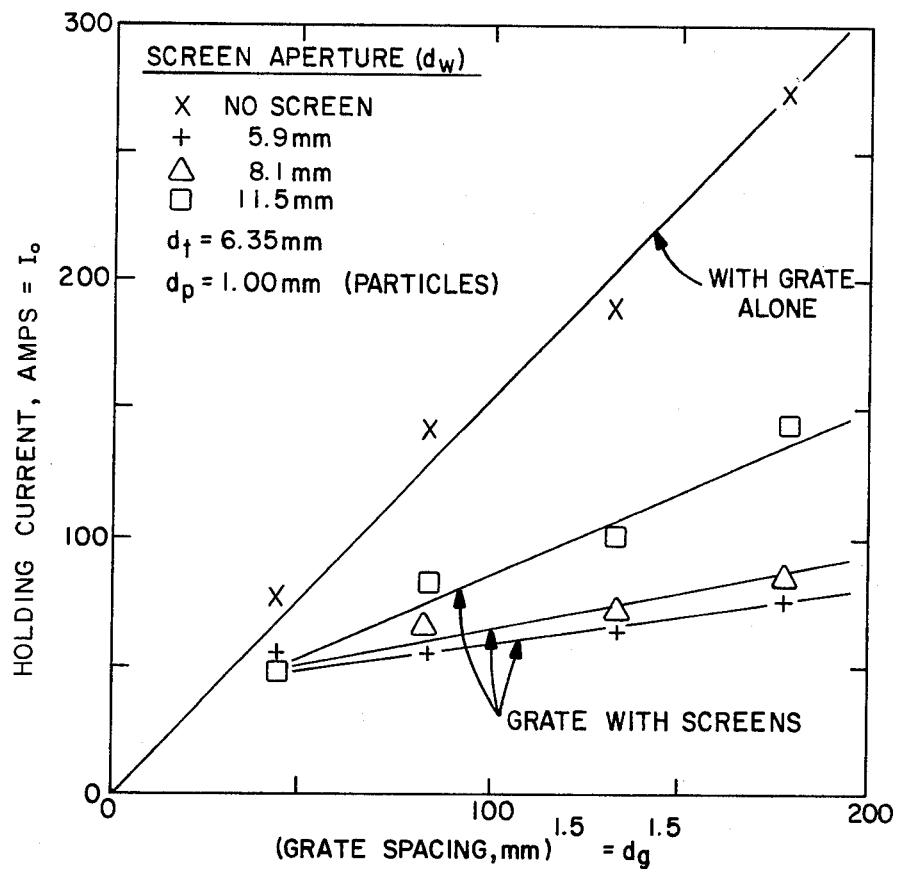
FIG.—10

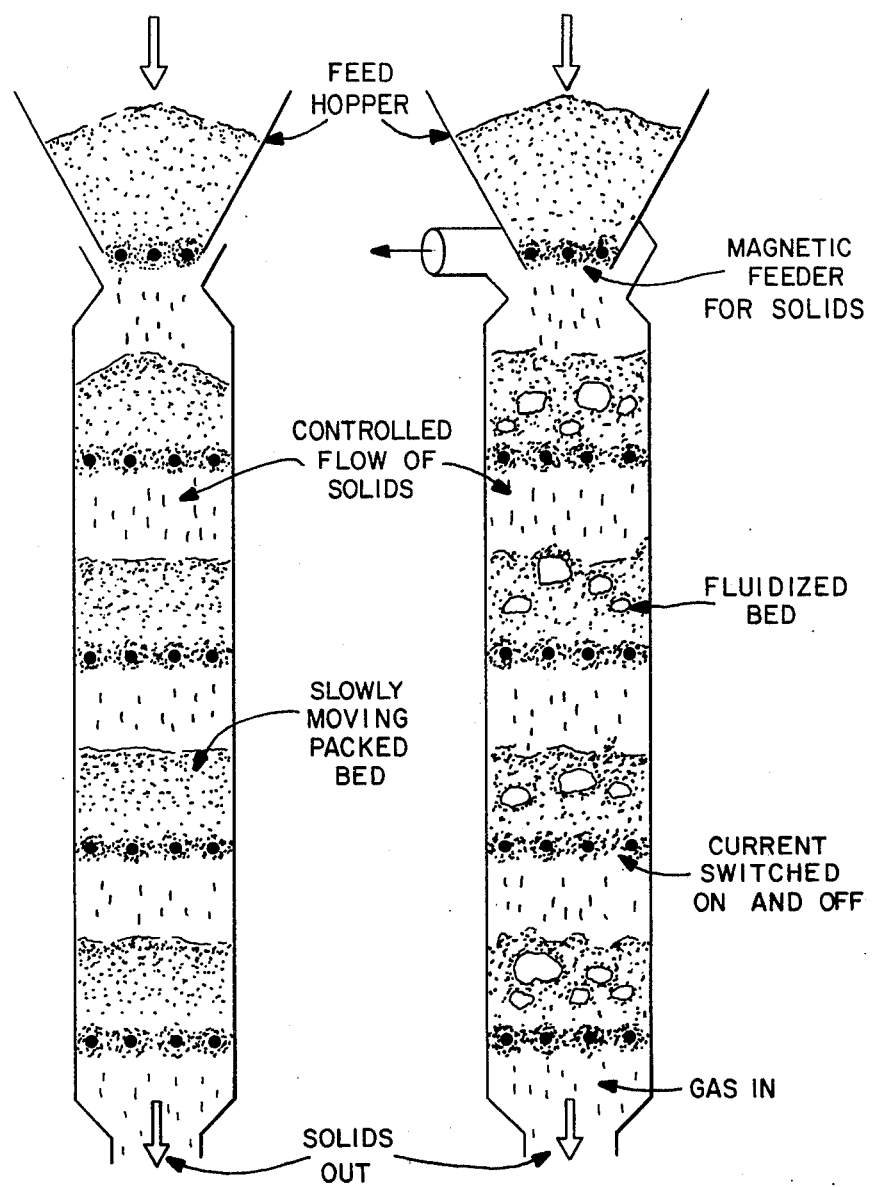
FIG.—11a   FIG.—11b

MAGNETIC DISTRIBUTOR-DOWNCOMER FOR FLUIDIZED BEDS AND MAGNETIC VALVE TO CONTROL THE FLOW OF SOLIDS

The present invention is directed to a new type of valve for shutting off or for controlling the flow of a stream of solid particles in pipes. It can also be used as a combined distributor-downcomer for fluidized beds. However, the particles must either be magnetic, or if in a mixture, the mixture must contain some magnetizable material. In its two versions this device may be called a magnetic valve for solids (MVS), and a magnetic distributor-downcomer (MDD).

At present most if not all valve arrangements for controlling the flow of solids such as slide valves, ball valves, star valves, etc. are mechanical in design; that is, they employ moving elements to block off part or all of the flow channel. This technique has a number of drawbacks including the creation of dead zones within the flow channel. Also, the valve itself is subject to erosion and requires a relatively large amount of operating power for large flow channels.

The magnetic valve disclosed herein overcomes these disadvantages in the following respects:

(a) It is a reliable, trouble free device for completely stopping or for controlling the flow of solids. It has no moving parts in the flow channel.

(b) With no moving parts it requires much less energy to turn the valve off and on.

(c) It controls the flow uniformly across the whole cross section of the flow channel thereby eliminating the bypassing, overtaking and gross dead zones for solids which are characteristic of partly closed conventional valves. With no restricted flow channel erosion is also reduced.

Multistage fluidized beds are a means for approaching the ideal of countercurrent contacting of gas and particulate solid. In these units downcomers are the means for leading the solids from stage to stage. It is a fact today that multistage fluidized beds are very rarely used in process industries, primarily because of the unreliable behavior of these downcomers; they plug up; they let gas bypass; and above all, they are unpredictable.

The magnetic distributor-downcomer for fluidized beds disclosed herein completely overcomes these problems, allowing for the first time for the development of reliable and positively controlled multistage fluidized bed contactors.

Of course, it should be noted throughout that this valve and distributor-downcomer will only operate with magnetizable particles, or with mixtures which contain at least some fraction of magnetizable particles.

As will be described in more detail hereinafter, the present invention operates in accordance with the following principles of operation. When an electric current flows through a conductor, say a copper wire, a magnetic field is generated around the wire, of high intensity near the wire, lower far away. When a magnetizable particle enters this field, it becomes magnetized, and it also experiences a force directed towards the conductor. This force is proportional to the field intensity times the field gradient, the latter term meaning the rate of change in field intensity with position. In symbols:

$$\begin{pmatrix} \text{force} \\ \text{towards} \\ \text{conductor} \end{pmatrix} \alpha \begin{pmatrix} \text{field} \\ \text{intensity} \end{pmatrix} \cdot \begin{pmatrix} \text{field} \\ \text{gradient} \end{pmatrix} \quad (1)$$

It can be shown theoretically, and has been verified experimentally (to be discussed hereinafter) that the force attracting a magnetizable particle to a straight wire conductor is proportional to the current flowing through the conductor to the 3/2 power, or $$\begin{pmatrix} \text{force} \\ \text{towards} \\ \text{conductor} \end{pmatrix} \alpha \, (\text{current}, I)^{3/2} \quad (2)$$

With a strong enough current, particles moving near the conductor will veer towards and freeze on it; and thus their flow can be stopped.

As a result of this phenomenon, when a region of high magnetic field with high field gradient is created in a narrow cross sectional slice of flow channel, the flow of solids can be stopped to create an on-off valve. When in addition to the flowing solids, there is an upflow of gas through the pipe, a fluidized bed can be created above the region of frozen solids. Turning the current off and on with the proper timing allows the frozen solids to be released in a desired manner, thus yielding a positively controlled distributor-downcomer. This then is the principle of operation of the magnetic valve for solids and of the magnetic distributor-downcomer.

These two devices (briefly outlined above) and other features of the present invention will be described in more detail hereinafter in conjunction with the drawings wherein:

FIGS. 1a–1d illustrate the main ideas of this invention, (a) with no current solids fall freely, (b) with current on the magnetizable solids freeze to the electrical conductors thereby blocking off the flow channel, (c) with additional flow solids pile up above the blocked zone, and (d) sufficient upflow of air creates a fluidized bed above the blocked section.

FIGS. 2a and 2b illustrate partially in perspective view two embodiments of this invention using electricity conducting tubes passing across the flow channel.

FIGS. 3, 3a, 3b, 4 and 5 show embodiments of this invention wherein soft iron in the form of discrete fins, spiral fins, slotted fins, and screens are used to increase the holding action by generating additional regions of high field gradients.

FIGS. 6a, 6b and 7 show other embodiments of this invention in which current carrying copper conductors are located outside the flow channel, however soft iron screens, iron wires, and iron plates located in the flow channel serve to create local regions of high field intensities with field gradients and support against gravity within the flow channel.

FIGS. 8 and 9 show still other embodiments of this invention which use suitably arranged permanent magnets, rather than electric currents, to generate the needed high field intensities and gradients.

FIG. 10 presents a sample of the data obtained with the valve arrangements of FIGS. 1 and 2, showing that the holding current can be greatly reduced by adding a screen of soft iron below the copper conductors (see FIG. 5). A non-magnetic screen would also do, though not as well.

FIG. 11(a) shows a possible multistage moving bed contactor which uses magnetic valves to control the flow rate of solids.

FIG. 11(b) shows a possible multistage gas-solid fluidized bed which uses magnetic distributor-downcomers.

Turning now to the drawings wherein like components are designated by like numerals throughout the various figures, attention is first directed to FIG. 1 which illustrates the main ideas of this invention.

FIG. 1a shows electrical conductors 20 placed across the flow path of a stream of solid particles, part or all of which are magnetizable. The stream of particles is shown by a downward pointing arrow 21, although the particles could just as well flow upward. When a sufficiently high electric current passes through the conductors the magnetizable particles are attracted to the conductors and freeze in place, eventually blocking off the flow channel, see 22 of FIG. 1b. With additional flow of solids, these will pile up above the blocked zone, as indicated at 23 in FIG. 1c. Thus the blocked zone acts as a shut off valve, and if the current is switched off and on at controlled intervals this becomes a control valve for solids, all with no moving parts or mechanical action in the flow channel. We call this a MAGNETIC VALVE FOR SOLIDS (MVS).

Finally, as shown in FIG. 1d, if air 24 is passed upward through the frozen solids 22 at a high enough velocity, the solids resting on the frozen layer will fluidize as indicated at 25 and the frozen layer 22 now acts as a distributor plate. Switching the current off and on allows a controlled downflow of solids from the fluidized bed. Thus the device acts both as a distributor plate and a downcomer. In this form we call this a MAGNETIC DISTRIBUTOR-DOWNCOMER for fluidized beds (MDD).

FIGS. 2a and 2b show various arrangements using the electrical conductors 20 of FIG. 1. Whether the current flows in parallel paths 30 shown in FIG. 2a, in back and forth loops 31 shown in FIG. 2b, or in any other way, in all these cases strong magnetic fields are created around the conductors with gradients towards the conductors. Consequently all these arrangements will operate satisfactorily.

Consider FIGS. 3-5. The presence of bodies of soft iron in a magnetic field increases the field strength and when properly placed will also provide at their edges high field gradients and support against gravity. Thus the transverse fins 41 on a representative electrical conductor 20 of FIG. 3, the spiral fins 44 on the electrical conductor 20 of FIG. 4, or the screen 45 suitably placed directly below the electrical conductor 20 of FIG. 5 will all improve the action and reduce the current needed to operate this device. Cutting slots 42 and 43 in the fins, for example as shown in FIGS. 3a and 3b creates additional high gradient zones and is better still.

Now it is not necessary that the electrical conductors be placed within the flow channels for solids. They can be placed outside while the magnetic field can be guided into the flow channel.

FIGS. 6a and 6b show one arrangement which uses this idea. If an electrical conductor 50 is coiled in a narrow slice around the flow channel 51 of FIG. 6a, and the current is turned on, a magnetic field is generated as shown by the dotted lines 52. An iron screen 53 placed within and across the flow channel as shown in FIG. 6b will collect these lines and produce above the wires the high field gradients needed to hold the magnetic particles. A soft iron shell 54 can also be added around the coil since it concentrates and guides the magnetic field there, thereby increasing the field strength.

Actually screen 53 need not be of magnetizable material. It can be made of copper for example. In this case the screen initially hinders the fall of a few particles, causing a local increase in the concentration of magnetic particles which then clump together, thereby distorting and concentrating the field, which in turn serves to collect more particles. The screen holds the cluster of particles against gravity and very soon the whole flowpath is blocked to the flow of solids. In the arrangement of FIG. 6b it is thus necessary to have screens or the like in the bed, whether magnetizable or not, which can support the weight of the solids.

FIG. 7 is another arrangement in which the electrical conductors are located outside the flow channel. Here the conductor 55 is coiled around a soft iron core 56 from which soft iron fingers 57 extend into the flow channel. These fingers provide an efficient guide and pathway for the magnetic field. A soft iron screen 58 resting on the lower fingers provides locations for collecting the field lines which jump from upper to lower fingers thereby generating the needed high field gradients.

In all the arrangements described so far, electric currents are used to develop the needed strong magnetic fields and gradients. However, it is not necessary to use electric current flow. Permanent magnets can also be used to develop these fields and gradients and this leads to still other versions of this invention.

FIG. 8 shows an arrangement which uses permanent magnets 60 placed N to S with a suitable non-magnetic spacer 61 between them, all of these in a sleeve or tube 62 or non-magnetic material. These sleeves are placed in parallel across the flow channel to intercept the flow of solids, similar to FIG. 1. The magnetic field in the neighborhood of one of these sleeves is shown as the dotted lines 63 in FIG. 8. To close the valve one needs merely to slide the magnets and spacers into the sleeve using suitable means. To open the valve one need merely to slide the magnets out of the sleeve. Soft iron screens (not shown) can be placed below the sleeves to enhance the action and generate regions of high field intensity.

FIG. 9 shows a different arrangement in which the permanent magnets 60 are placed in opposition, N to N, S to S, in the sleeve 62. The field lines are then shown by the dotted lines 63. In this arrangement the magnets strongly repel each other and would spring apart unless restrained. The spread apart position gives lower field intensities, the pushed together configuration gives high field intensities. If these intensities span the critical intensity needed to freeze the solids we have a valve action. Again, iron screens placed below these sleeves will improve the behavior by distributing the regions of high field gradients more uniformly across the flow channel.

Experiments, both qualitative and quantitative, were made with a number of the designs described above to verify the operation of this valve and distributor-downcomer and to determine the current and power consumption needed to keep the solids frozen in place. We summarize these findings briefly below.

The first set of experiments were done with the set up of FIG. 2b. Six narrow size cuts of iron particles and iron-sand mixtures from 0.14 to 2 mm. were rained down through a vertical 2" pipe in which water cooled copper tubes ⅛", ¼" and ⅜" OD were used as electrical conductors. The center to center spacing of these copper tubes varied from 13 to 31 mm. Water cooling served to keep the temperature, hence resistance, hence power consumption low. In fact power dissipation was so low that water cooling was found to be unnecessary in most of our experiments.

Experimental findings with this set up are summarized very briefly below:

(a) The current needed to create the frozen layer of solids, called the blocking current, was higher than that needed to hold the solids in place, called the holding current.

(b) Reducing the center to center spacing of the tubes, called the grate spacing, or the size of copper tubes, or the size of flowing particles, or the fraction of non-magnetizable material in a mixture reduced the holding current.

(c) Theory predicts that the holding current should be approximately proportional to the 3/2 power of the grate spacing. This was found to be so.

Additional experiments with copper tubes with iron screens placed directly below, as shown in FIG. 5, showed the following:

(a) Iron screens placed above the tubes did not appreciably reduce the holding current, iron screens below the tubes did do so.

(b) The smaller the screen opening the more effective was the screen.

(c) When the screen opening is very much smaller than the grate spacing the screen spacing determined the holding current, not the grate spacing.

Typical results with these geometries are illustrated in FIG. 10. Note that for tubes alone the holding current is proportional to the 3/2 power of grate spacing, that iron screens do reduce the holding current appreciably, and that the smaller is the screen opening, the more effective is the screen.

Overall, the current needed to hold the solids frozen was of the order of 50-100A, and the power dissipation for a reasonably designed valve or distributor-downcomer in a 6"flow channel or 6" fluidized bed is about 30 W. Additional experiments with the arrangements of FIGS. 6 and 7 showed that these were about equally effective in that they required roughly the same current to block the flow channel and hold the particles.

Magnetic fields have recently been used to modify the behavior of gas fluidized beds to yield what is called the magnetic stabilized bed (MSB), and it would be of interest to contrast the mechanism of action of MSB's with the present invention.

In the MSB (see U.S. Pat. Nos. 4,115,927 to Rosensweig; No. 4,143,469 to Kamholz; No. 4,272,893 to Levenspiel and Kamholz) an electrical conductor is wound around the outside of the whole bed, from below the bottom to above the top. A uniform magnetic field is thereby created within the bed, the magnetizable particles become magnetized, line up vertically along the field lines, but are otherwise fairly uniformly distributed in the bed. Bubbling action is eliminated and the bed behaves as an expanded bed of uniform suspended solids. No field gradients exist in this situation and consequently equation 1 shows that the particles are not subjected to body forces pushing them to a conductor or screen to form a blocked zone of packed solid.

On the other hand, in the present invention particles collect and are held against gravity in a fixed layer by the combined action of a strong field and strong field gradients, again see equation 1. Thus the mechanism of action, the controlling forces, the nature of the aggregate of solids and their response to gravity differ. Also, in this invention one can have a very small proportion of magnetizable solids in the mixture, which is not the case with the MSB.

As another important point of difference when the MSB is fully operational particle movement is severely restricted or completely absent thus heat transfer and heat dissipation is minimal. In contrast to this, in the present invention the fluidized particles above the frozen distributor solids circulate freely. The heat transfer characteristics are therefore those of a normal fluidized bed, thus allowing this device to be used in a wide class of chemical processes in which there is significant heat release.

The magnetic valve, switched off and on at the right intervals, can become the key component of a new class of multistage packed bed gas-solid contactors which treats the solids gently and yields close to plug flow of solids, even in mixtures which contain only small proportions of magnetizable particles. FIG. 11a illustrates such a device.

More important still, it can be used as both distributor and downcomer in a new type of multistage gas-solid fluidized bed contactor (heat exchanger, adsorber, reactor, filter, etc.) which positively and reliably controls the solid flow rate onto and out of all stages, which completely eliminates the problem of plugging downcomers and distributor plates, and in which any desired stagewise temperature progression can be maintained. FIG. 11b illustrates such a device.

From the foregoing description of the various arrangements described, it should be apparent that many different functions can be achieved utilizing the basic principles underlying these arrangements, that is, the formation of one or more walls or barriers 20 and the ability to provide and remove these barriers quickly and reliably. These arrangements can be used in a particle conveyance tube for positive control of solids transported therethrough, as a distributor in a fluidized bed, even as a redistributor, bubble controller and bubble dissipator in a fluidized bed, or in general, in any flow channel through which magnetizable particles are to move. The arrangements can be used to control the flow of material or entirely stop it while, at the same time, gas can be passed therethrough, thereby providing the distributor in a fluidized bed, as described.

With proper design, both magnetizable and non-magnetizable solid particles can be made to flow together, or to move past each other with controlled relative velocity. This kind of flow pattern would be useful in filtering, in solid-solid contacting and in heat transfer application.

For purposes herein, the following is to be understood:

Magnetizable particles shall mean any particles capable of being magnetized including but not limited to iron, cobalt, nickel and magnetite particles. Magnetizing means refers to those means capable of generating the magnetic field and field gradients, described previously, including electricity carrying wires and permanent magnets. Magnetizable (but not permanently magnetizable) means refers to means including but not limited to fins, screens, bars, rods, wires, and plates made of soft iron (or the like) which when placed in the magnetic field channel guide and amplify the magnetic field and also concentrate the field to create zones of high field gradients.

What is claimed is:

1. A magnetically operated valve arrangement for turning on and off the flow of solid particles including at least a certain minimum amount of magnetizable particles, said valve arrangement comprising:
   (a) means defining a confined pathway through which all of said particles are adapted to flow from an upstream point when said valve arrangement is maintained in an opened operating condition;
   (b) fixed structural means extending into said pathway without preventing said particles from flowing therethrough when said valve arrangement is in its opened operating condition; and
   (c) means including said structural means cooperating with said pathway for closing the latter to the passage of upstream particles at any given time by causing downstream magnetizable particles passing through the pathway at that time to become fixedly magnetized to one another at said structural means within said pathway in sufficient quantity to completely close the latter to the flow of solids.

2. A valve arrangement according to claim 1 wherein said closing means includes magnetizable but not permanently magnetized means fixedly disposed within or at least in close proximity to said pathway so as not to prevent the flow of said particles therethrough when maintained in a non-magnetized condition and means for temporarily magnetizing said magnetizable means at said given time so as to cause said downstream magnetizable particles passing through the pathway at said structural means at that time to become magnetized to it.

3. A valve arrangement according to claim 1 wherein said magnetizable means includes a current carrying conductor having opposite end section disposed outside said pathway and an intermediate section at least a portion of which is disposed within said pathway, said portion also serving as said structual means, and wherein said magnetizing means includes means connected with said conductor end sections for selectively applying a current through said conductor.

4. A valve arrangement according to claim 3 wherein the intermediate section of said conductor is a single continuous length of the conductor forming a series of back-and-forth loops, segments of each of which are disposed within and across said pathway.

5. A valve arrangement according to claim 3 wherein the intermediate section of said conductor includes a single continuous length of the conductor forming a spiral which is disposed within and across said pathway.

6. A valve arrangement according to claim 3 wherein the intermediate section of said conductor includes a plurality of spaced-apart parallel segments disposed within and across said pathway.

7. A valve arrangement according to claim 3 wherein said magnetizable means includes fin means constructed of soft iron connected directly to and extending out from the portion or portions of the intermediate conductor section within said flowpath.

8. A valve arrangement according to claim 7 wherein said fin means includes a plurality of individual soft iron plates disposed around the portion or portions of the intermediate conductor section within said flowpath in longitudinally spaced relationship to one another.

9. A valve arrangement according to claim 7 wherein said fin means includes a single continuous helical fin extended around a corresponding length of a portion of said intermediate cable section within said flowpath.

10. A valve arrangement according to claim 3 wherein said magnetizable means includes a soft iron screen disposed within and across said pathway in contact with or at least in close proximity to the portion or portions of said intermediate conductor section within said pathway.

11. A valve arrangement according to claim 2 wherein said magnetizable means includes a magnetizable member which is disposed within and across said pathway and which also serves as said structural means and wherein said magnetizing means includes means located outside said pathway for selectively producing a magnetic field and field gradient within said pathway sufficient to magnetize said member.

12. A valve arrangement according to claim 11 wherein said magnetizing means includes an electrical conductor coiled around the flow channel.

13. A valve arrangement according to claim 11 wherein said magnetizing means includes an electrical coil disposed adjacent to said pathway and wherein the magnetic field generated is guided into the valve section by magnetizable means such as soft iron plates protruding into the flowpath.

14. A valve arrangement according to claim 1 wherein said closing means includes a non-magnetic sleeve, an intermediate longitudinal section of which is disposed within and across said pathway and serves as said structural means, permanent magnetic means designed for movement into and out of said sleeve and of sufficient strength to magnetize said magnetizable particles outside but in close proximity to said sleeve and means within said sleeve section at said given time whereby to cause said downstream magnetizable particles to be fixedly magnetized to the permanent magnets from outside said sleeve and a position outside said sleeve section whereby to release said magnetized particles.

15. A valve arrangement according to claim 1 wherein said closing means includes a non-magnetic sleeve, an intermediate section of which is disposed within and across said pathway and serves as said structural means, permanent magnets disposed within said sleeve and of sufficient strength to magnetize said magnetizable particles outside but in close proximity to said sleeve, and means for selectively dampening the magnetic characteristics of said permanent magnets while in said sleeve whereby to control when magnetizable particles are magnetized thereto.

16. A valve arrangement according to claim 1 wherein said closing means includes means for controlling the flow rate of said particles as the latter pass through said pathway by periodically causing the magnetizable particles passing therethrough to become fixedly magnetized within the pathway for desired periods of time.

17. A valve arrangement according to claim 1 wherein said closing means includes magnetizable but not permanently magnetized means fixedly disposed within said pathway so as not to interfere with the flow of said particles therethrough when maintained in a non-magnetized condition, said magnetizable means also serving as said means, means for temporarily magnetizing said magnetizable means at said given time so as to cause said downstream magnetizable particles passing through the pathway at that time to bcome magnetized to it, said magnetizing means also being capable of magnetizing and demagnetizing said magnetizable particles at a predetermined frequency whereby to control the speed of all of the particles as the latter pass through said pathway.

18. A valve arrangement according to claim 1 including means for passing a gas continuously through said pathway and therefore through said magnetized particles whereby the latter forms the support for the solids resting above, so as to yield a fluidized bed.

19. A valve arrangement according to claim 1 wherein said structural means is a screen fixedly located across said pathway.

20. A valve arrangement according to claim 19 wherein said screen is formed of magnetizable material and wherein said closing means includes means for magnetizing said screen as well as said downstream magnetizable particles.

21. A valve arrangement according to claim 1 wherein said structural means is formed of magnetizable material and wherein said closing means includes means for magnetizing said structural means as well as said downstream magnetizable particles.

22. A magnetically operated valve arrangement for controlling the flow rate of solid particles including at least a certain minimum amount of magnetizable particles, said valve arrangement comprising:
  (a) means defining a confined pathway through which all of said particles are adapted to flow from an upstream point when said valve arrangement is maintained in an opened operating state;
  (b) magnetizable but not permanently magnetized means fixedly disposed within said pathway; and
  (c) means for rapidly magnetizing and demagnetizing said magnetizable means at a controlled frequency so as to cause the magnetizable particles passing through said pathway to be magnetized to and released from said magnetizable means and one another as the magnetizable means is magnetized and demagnetized sufficient to control the flow rate of all of the particles as the latter pass through said pathway.

23. A magnetically operated valve assembly for controlling the flow of solid particles including at least a certain minimum amount of magnetizable particles along a predetermined flowpath, said assembly comprising a plurality of magnetically operated valve arrangements respectively including valve bodies which define confined pathways co-extensive with successive sections of said flowpath and through which all of said particles are adapted to flow when said valve arrangements are maintained in opened operating states and structural means fixedly disposed within each pathway without preventing the flow of said particles when said arrangements are in said opened operating states, each of said valve arrangements including means independent of the other arrangements and cooperating with its associated pathway for closing the latter to the passage of upstream particles at any given time by causing downstream magnetizable particles passing through that pathway at that time to become fixedly magnetized within that pathway in sufficient number to completely close the latter to the flow of solids.

24. An assembly according to claim 23 wherein the closing means forming part of each of said valve arrangements includes magnetizable but not permanently magnetized means fixedly disposed within or at least in close proximity to its associated pathway and means for temporarily magnetizing its magnetizable means at said given time so as to cause said downstream magnetizable particles passing through the pathway at that time to become magnetized to it.

25. A magnetically operated fluidized bed arrangement of particles including at least a certain amount of magnetizable particles, said arrangement comprising:
  (a) means defining a confined pathway through which all of said particles are adapted to flow;
  (b) fixed structural means extending into said pathway without preventing said particles from flowing therethrough when said valve arrangement is in its opened operating condition;
  (c) means cooperating with said pathway for causing the magnetizable particles therein to become fixedly magnetized at said structural means in sufficient number to completely close the pathway to the flow of solids so as to provide a gas distributor for the bed of solids above; and
  (d) means for directing a stream of gas through said fixedly held particles and the additional particles resting above whereby to fluidize the latter.

26. A fluidized bed arrangement according to claim 25 wherein said closing means includes magnetizable but not permanently magnetized means fixedly disposed within said pathway so as not to interfere with the flow of said particles therethrough when maintained in a non-magnetized condition and means for temporarily magnetizing said magnetizable means so as to cause said magnetizable particles within said pathway to become magnetized to it so as to provide an effective support for said bed of particles, said magnetizable means also serving as said structural means.

27. A method of controlling the flow of solid particles including at least a certain minimum amount of magnetizable particles as the latter move along a predetermined flowpath, said method comprising the steps of:
  (a) defining a confined pathway co-extensive with a section of said flowpath and through which all of the particles are adapted to flow from an upstream point, said pathway being defined to include structural means extending therein; and
  (b) closing said pathway to the passage of upstream particles at any given time by causing downstream magnetizable particles within the pathway at that time to become fixedly magnetized within the pathway and at said structural means in sufficient number to completely close the latter.

28. A method according to claim 27 wherein said structural means is magnetizable and including the step of magnetizing said structural means in order to magnetize said downstream magnetizable particles.

29. A method of controlling the flow of solid particles including at least a certain minimum amount of magnetizable particles as the latter move along a predetermined flowpath, said method comprising the steps of:
  (a) defining a confined pathway co-extensive with a section of said flowpath and through which all of said particles are adapted to flow from an upstream point, said pathway being defined to include structural means extending therein; and
  (b) for any given time period, successively causing the magnetizable particles passing through said pathway during said period to become fixedly magnetized at said structural means and then demagnetized at a controlled frequency sufficient to control the flow rate of all of the particles as they pass through said pathway during said period.

30. A method of forming a fluidized bed of solid particles including at least a certain minimum amount of magnetizable particles, said method comprising the steps of:
- (a) defining a confined region in which all of said particles are present, said region being defined to include structural means extending therein at its lower end;
- (b) causing magnetizable particles at the structural means of the lower end of said region to become fixedly magnetized in place in sufficient number to completely close the lower end of said region to the flow of solids and thereby form a support for the particles resting above and to serve as a gas distributor for the bed; and
- (c) directing a stream of gas through said bed of supported particles for fluidizing the latter.

31. A method for controlling the flow rate of solids from a fluidized bed according to claim 30 by reducing the field strength and field gradient at regular intervals so as to release the supporting layer of solids at a controlled rate, thus yielding a distributor-downcomer for the fluidized bed.

* * * * *